(12) United States Patent
Nadkar et al.

(10) Patent No.: US 11,164,570 B2
(45) Date of Patent: Nov. 2, 2021

(54) VOICE ASSISTANT TRACKING AND ACTIVATION

(71) Applicant: Ford Global Technologies, LLC, Dearborn, MI (US)

(72) Inventors: Ashish Nadkar, San Jose, CA (US); Alan Daniel Gonzalez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 15/408,171

(22) Filed: Jan. 17, 2017

(65) Prior Publication Data

US 2018/0204569 A1     Jul. 19, 2018

(51) Int. Cl.
*G10L 15/22* (2006.01)
*G06F 3/16* (2006.01)
*G10L 15/30* (2013.01)
*G10L 15/08* (2006.01)

(52) U.S. Cl.
CPC .............. *G10L 15/22* (2013.01); *G06F 3/167* (2013.01); *G10L 15/30* (2013.01); *G10L 2015/088* (2013.01); *G10L 2015/227* (2013.01)

(58) Field of Classification Search
CPC ..... G06F 3/167; G06F 17/30654; G10L 15/22
USPC ........................................................ 704/275
See application file for complete search history.

(56) References Cited

U.S. PATENT DOCUMENTS

| 6,219,645 | B1* | 4/2001 | Byers ................... G10L 15/02 381/91 |
| 6,397,186 | B1* | 5/2002 | Bush ..................... G06F 3/167 704/274 |
| 8,009,025 | B2 | 8/2011 | Engstrom |
| 8,433,041 | B2* | 4/2013 | Clark ................. H04M 3/42204 340/5.52 |
| 9,104,537 | B1 | 8/2015 | Penilla |
| 9,250,856 | B2 | 2/2016 | Danne |
| 9,396,727 | B2 | 7/2016 | Tzirkel-Hancock |
| 10,057,421 | B1* | 8/2018 | Chiu .................... H04M 3/4936 |
| 2003/0088413 | A1* | 5/2003 | Gomez .................. G10L 15/22 704/246 |
| 2007/0036117 | A1* | 2/2007 | Taube .................... H04W 4/02 370/338 |

(Continued)

FOREIGN PATENT DOCUMENTS

CN         104363331 A     2/2015

*Primary Examiner* — Jakieda R Jackson
(74) *Attorney, Agent, or Firm* — Michael J. Spenner; Brooks Kushman P.C.

(57) ABSTRACT

According to one embodiment, a system for voice assistant tracking and activation includes a tracking component, a wake component, a listening component, and a link component. The tracking component is configured to track availability of a plurality of voice assistant services. The wake component is configured to determine a plurality of wake words, each plurality of wake words corresponding to a specific voice assistant service of the plurality of voice assistant services. The listening component is configured to receive audio and detect a first wake word of the plurality of wake words that corresponds to a first voice assistant service of the plurality of voice assistant services. The link component is configured to establish a voice link with the first voice assistant service for voice input by the user.

22 Claims, 5 Drawing Sheets

(56) References Cited

U.S. PATENT DOCUMENTS

| | | | |
|---|---|---|---|
| 2012/0011192 A1* | 1/2012 | Meister | G06Q 10/107 |
| | | | 709/203 |
| 2013/0238326 A1* | 9/2013 | Kim | G06F 3/167 |
| | | | 704/231 |
| 2013/0275164 A1* | 10/2013 | Gruber | G10L 17/22 |
| | | | 705/5 |
| 2014/0195663 A1 | 7/2014 | Hirschenberger | |
| 2014/0208295 A1* | 7/2014 | Yang | G06F 8/70 |
| | | | 717/120 |
| 2014/0222436 A1* | 8/2014 | Binder | G06F 3/167 |
| | | | 704/275 |
| 2015/0053781 A1* | 2/2015 | Nelson | F24F 11/30 |
| | | | 236/1 C |
| 2015/0169336 A1* | 6/2015 | Harper | G10L 15/22 |
| | | | 715/706 |
| 2015/0373193 A1* | 12/2015 | Cook | H04M 3/436 |
| | | | 455/406 |
| 2015/0379993 A1* | 12/2015 | Subhojit | G10L 15/06 |
| | | | 704/275 |
| 2016/0098992 A1* | 4/2016 | Renard | G10L 15/18 |
| | | | 704/275 |
| 2016/0155443 A1* | 6/2016 | Khan | G06F 1/3203 |
| | | | 704/275 |
| 2017/0332168 A1* | 11/2017 | Moghimi | H04R 3/005 |
| 2018/0018961 A1* | 1/2018 | Lee | G10L 15/08 |

\* cited by examiner

VOICE ASSISTANT TRACKING AND ACTIVATION

TECHNICAL FIELD

The disclosure relates generally to methods, systems, and apparatuses for voice assistant tracking and more particularly relates to methods, systems, and apparatuses that establish voice links with a voice assistant based on a corresponding wake word.

BACKGROUND

People spend a large amount of time in automobiles during commutes, vacation, or other travels. While driving, drivers or passengers often need or want to access information or services available on computing systems, such as an in-dash computing system or mobile devices carried by the passengers. Speech-to-text and voice assistant applications can provide drivers or passengers the ability to interact with computing systems to obtain information, perform actions, or receive responses to queries. However, it can be difficult to manage a plurality of available speech-to-text or voice assistant services.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
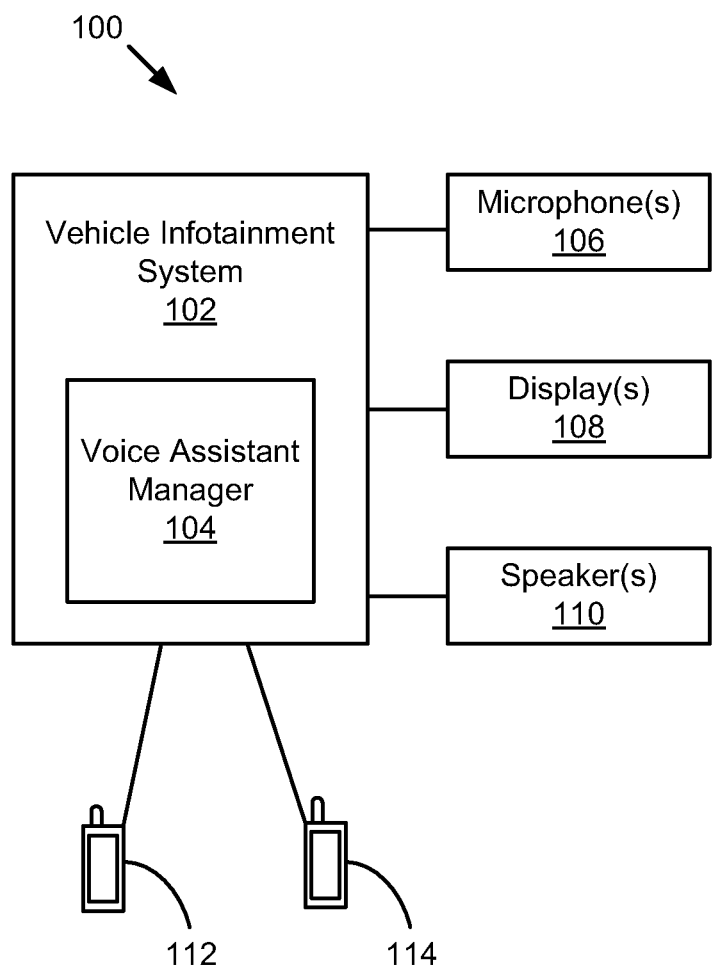
FIG. 1 is a schematic block diagram illustrating an implementation of a system for voice assistant tracking and activation, according to one implementation.

An in-vehicle infotainment system may allow a driver to interact with the system using voice commands, which is usually initiated by a press of a hardware or physical key (such as on a steering wheel) or soft button on screen. Voice commands are usually limited only for driver interaction and not every passenger is able to access them. Additionally, hardware push-to-talk buttons are generally tied to a single voice assistant, so all the voice interactions are usually routed to a single pre-selected voice assistant. Wake-word triggered voice assistants may eliminate the explicit need of a key press and may allow every passenger in a car to have natural voice interaction with any available voice assistant. In one embodiment, a passenger may summon a particular voice assistant (by uttering an appropriate wake-word) which the passenger knows to be better/more suitable at answering/doing certain job than others. For example, a first voice assistant may be better at answering weather/traffic updates, while a second voice assistant may be better at adding items to shopping list.

Voice interaction with infotainment systems may allow for seamless and natural interactions. Applicant has recognized that, as more and more voice assistants are available in the market, there may be multiple scenarios where customers would want them to be used in the car. Applicant has developed and discloses herein systems, methods, and devices for an always listening voice platform that tracks availability of different voice assistant services. The voice assistant services may include applications or services, such as voice interaction in an in-vehicle infotainment system, or voice assistant services available on other devices, operating systems, or apps (such as Siri®, Alexa®, or other voice interaction systems). Systems, methods, and devices, may allow a user to control systems or devices in a vehicle using an infotainment system's default voice control app, or any other voice assistant by establishing a voice link with an application when a user summons them using a respective wake-word. For example, any available voice assistant may be activated using a simple wake-word trigger without requiring interactions with a default voice assist system.

According to one embodiment, a system for voice assistant tracking and activation includes a tracking component, a wake component, a listening component, and a link component. The tracking component is configured to track availability of a plurality of voice assistant services. The wake component is configured to determine a plurality of wake words, each plurality of wake words corresponding to a specific voice assistant service of the plurality of voice assistant services. The listening component is configured to receive audio and detect a first wake word of the plurality of wake words that corresponds to a first voice assistant service of the plurality of voice assistant services. The link component is configured to establish a voice link with the first voice assistant service for voice input by the user.

In one embodiment, an in-vehicle infotainment system may establish voice link with at least three different categories of voice assistant services or applications including native, hands-free profile, or voice assistant applications running on paired devices. Native voice assistant service applications may include a default voice control app available within or on an in-vehicle infotainment system. Hands-free profile assistant service applications may include a Bluetooth hands-free profile activated using a voice application on a paired mobile application, such as Apple® Siri®, Samsung® S Voice®, or the like. Voice assistant applications running on paired devices may include voice assistant applications running on a smartphone or other mobile device. For example, voice assistant applications running on paired devices may be available using application integration platforms like AppLink®, CarPlay®, and/or Android Auto®. Example voice assistant applications running on paired devices may include applications such as Amazon's Alexa®.

In one embodiment, a system for voice assistant tracking and activation includes an always listening voice recognizer module, which can launch a user summoned voice assistant. It may track the availability of different voice assistant apps, such as a native default voice control application, Siri®, Alexa®, or the like, and establishes the voice link with these applications when a user summons them using respective wake-word. To activate a service, the user may say a wake-word and wait for a visible and/or audible prompt before issuing a voice command. For example, the user may say "Alexa," wait for a prompt, and then say "open garage door." In one embodiment, the user may issue voice commands along with wake-words, without delaying or waiting for a prompt. For example, the system may parse out the command and perform the intended action. For example, the user may say "Alexa, open garage door" without a delay. The system may take this audio, detect the "Alexa" wake word, and then provide the remaining portion "open garage door" to the correct voice assistant (e.g., the Alexa® voice assistant).

While illustrative embodiments for voice assistant tracking and activation are presented for vehicle environments, the teaching disclosed herein may apply to any environment where multiple voice assistant or speech-to-text applications are available. For example, systems for voice assistant tracking and activation may be targeted for and/or used for office environments, in-home environments, culinary environments, warehouse environments, or the like. For example, a voice assistant manager may be used to manage voice assistants or devices such as Amazon Echo®, Google Home®, or the like.

Further embodiments and examples will be discussed in relation to the figures below.

Referring now to the figures, FIG. 1 illustrates a system 100 for voice assistant tracking and activation, according to one embodiment. The system 100 includes a vehicle infotainment system 102. Vehicle infotainment system 102 may provide informational or entertainment services to a driver or passenger in a vehicle. For example, the vehicle infotainment system 102 may provide navigation, music, temperature control, or other services for drivers or passengers in the vehicle.

The vehicle infotainment system 102 may be connected to, or in communication with, one or more microphones 106, one or more displays 108, and/or one or more speakers 110. The vehicle infotainment system 102 may gather audio from a cabin or interior of the vehicle using the one or more microphones 106. For example, the one or more microphones 106 may receive audio including voice commands or other audio data from within the cabin. The vehicle infotainment system 102 may perform actions in response to the voice commands. In one embodiment, the vehicle infotainment system 102 may forward on commands to other devices or systems, as will be discussed further below.

The one or more displays 108 may be used to display information or entertainment content to the driver or passengers. The displays 108 may include one or more of an in-dash display, roof mounted video display, or any other display at any other location in the vehicle. For example, video or other content may be displayed on a display 108 for entertainment purposes. Additionally, a notification, prompt, status of a vehicle system, status of a connected device, or system, or the like may be displayed to a user.

The speakers 110 may include a vehicle sound system or other speaker for playing music, notification sounds, phone call audio, responses from voice assistant services, or the like. For example, the vehicle infotainment system 102 may provide audio such as music, audio accompanying a video, audio responses to user requests, or the like to the speakers 110.

In one embodiment, the vehicle infotainment system 102 may include a voice assistant manager 104. The voice assistant manager 104 may manage a plurality of voice assistant services available within the system 100. For example, the voice assistant manager 104 may track the available voice assistance systems that are native to the vehicle infotainment system 102 or are running on connected devices, such as the first mobile device 112 or a second mobile device 114. In one embodiment, the voice assistant manager 104 may track all available voice assistant services or applications as well as a corresponding wake word for each voice assistant service. When the wake word for a specific voice assistant service is detected, the voice assistant manager 104 may activate and/or establish a link between the specific voice assistant service and a microphone 106.

For example, the voice assistant manager 104 may receive audio obtained and supplied by the microphone 106 and detect wake words within the audio. In response to receiving or detecting a wake word, the voice assistant manager 104 may activate the corresponding voice assistant service and create an audio link between the one or more microphones 106 and the corresponding voice assistant system. The audio link may provide audio from the microphones 106 to the corresponding voice assistant service, provide audio from the voice assistant service to the speakers 110, and/or provide video or graphical information to one or more displays 108.

The voice assistant manager 104 may manage voice assistant services native to the vehicle infotainment system 102 or voice assistant service located on separate devices that are in communication with the voice infotainment system 102. For example, the voice assistant manager 104 may provide a gateway to a plurality of voice assistant services to allow a user to seamlessly use any available voice assistant by simply speaking the wake word of the desired service. In one embodiment, the voice assistant manager 104 tracks available voice assistant services. For example, the available voice assistant services may change and vary over time as mobile devices enter and exit a cabin of a vehicle and/or as the mobile devices connect or disconnect (pair or unpair) with the vehicle infotainment system 102. For example, the voice assistant manager 104 may maintain a list of available devices and voice assistant services and may update the list each time a device connects or disconnects from the vehicle infotainment system 102.

In one embodiment, the voice assistant manager 104 determines a wake word for each available voice assistant service. For example, the voice assistant manager 104 may include a wake word for each available voice assistant service. The voice assistant manager 104 may only listen for wake words that correspond to available voice assistant services. For example, the list of voice assistant services may include one or more wake words for each voice assistant service. For example the first and second mobile devices 112, 114 may include any type of computing device such as a smartphone, a tablet, a smart watch, a laptop computer, or any other computing device. A mobile computing device may pair with the vehicle infotainment system 102 and notify the voice assistant manager 104 of any available voice assistant services on the mobile device.

The voice assistant manager 104 may receive a stream of audio from the microphones 106 and analyze the audio to detect the wake words. When a wake word is detected, the voice assistant manager 104 may look up the corresponding voice assistant service and establish an audio link (or other communication link) between the corresponding voice assistant service and the microphones 106, displays 108, and/or speakers 110 of the system 100. For example, the voice assistant manager 104 may establish a link between a voice assistant service on the first mobile device 112 in response to a first wake word, establish a link between a voice assistant service on the second mobile device 114 in response to a second wake word, or establish a link between a voice assistant service native to the vehicle infotainment system 102 in response to a third wake word. Similarly, different voice assistant services on the same device or system may be activated based on different wake words.

Figure 2:
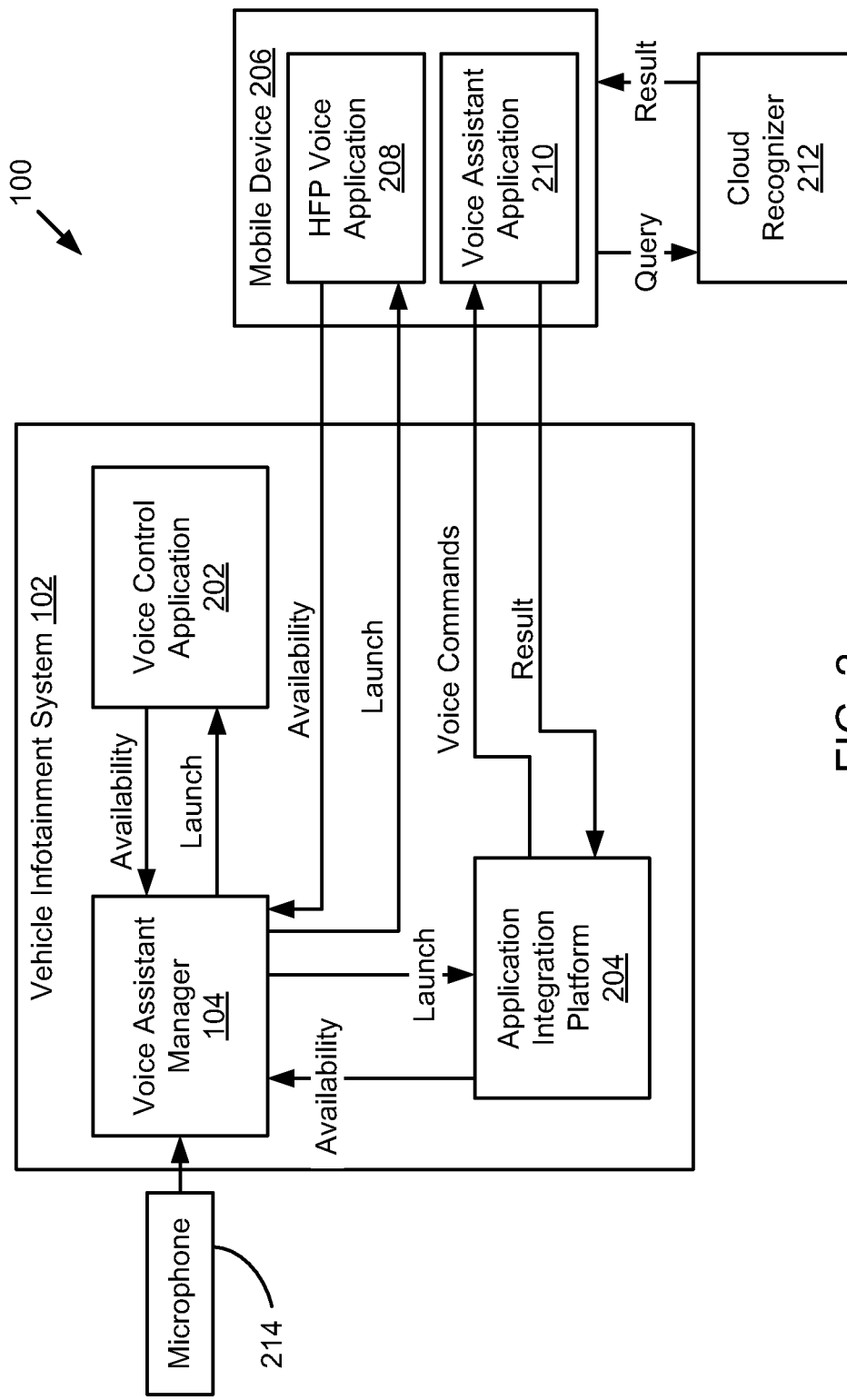
FIG. 2 is a schematic block diagram illustrating communication between parts of a system for voice assistant tracking and activation, according to one implementation.

FIG. 2 is a schematic block diagram illustrating communication between parts of a system 100 for voice assistant tracking and activation. The vehicle infotainment system 102 includes a voice assistant manager 104, a voice control application 202, and an application integration platform 204. The vehicle infotainment system 102 may pair with and communicate with a mobile device 206, separate from the vehicle infotainment system 102. For example, the vehicle infotainment system 102 may include a radio for communicating with other devices over a Bluetooth, Wi-Fi, or other wireless interface. Additionally, a wired or physical connection may also be used for communication between the vehicle infotainment system 102 and another device. For example, application integration over AppLink and CarPlay for an iOS device may be provided via a USB connection.

In one embodiment, the voice assistant manager 104 is an always listening voice recognizer module that can launch a user summoned voice assistant. The voice assistant manager 104 may communicate with voice assistant services to track their availability and/or to activate them at an appropriate time. In one embodiment, the voice assistant manager 104 receives an availability of voice assistant services from the voice control application 202, mobile device 206, and/or application integration platform 204. For example, the voice control application 202, mobile device 206, and/or application integration platform 204 may send a message to the voice assistant manager 104 indicating that a specific device or voice assistant service is available. In response to detecting a wake word in an audio stream provided by a microphone 214, the voice assistant manager 104 may send a message to trigger a launch of a corresponding voice assistant. For example, the voice assistant manager 104 may send a message indicating a name of the voice assistant service to activate to the voice control application 202, mobile device 206, and/or application integration platform 204.

The voice control application 202 may include a default voice control application available within the vehicle infotainment system 102 or other in-vehicle computing system. The voice control application 202 may provide control over one or more systems of the vehicle such as a temperature control, radio or sound system, driving style or characteristics, entertainment system, or the like of the vehicle. A user (driver or passenger) may be able to speak to provide voice commands to allow for hands-free control of or hands-free information about the various systems of the vehicle.

The hands-free profile (HFP) voice application 208 may include a hands-free profile (such as a Bluetooth hands-free profile) activated on the paired mobile device 206. The HFP voice application 208 may include a system level or operating system level voice control application of the mobile device 206. For example, the HFP voice application 208 may provide device level, system level, or operating system level control of the mobile device 206. Example HFP voice applications 208 may include applications such as Siri® available on the iPhone®, S Voice® available on Samsung® devices, voice applications available through Google®, or any other such application.

The application integration platform 204 may include a platform for detecting and communicating with a voice assistant application 210 on a mobile device 206. The application integration platform 204 may detect voice assistant applications that are not the main or default voice control applications of a device. For example, the application integration platform 204 may detect voice assistant services that do not include a HFP voice application, such as the HFP voice application 208. HFP voice applications 208 may be configured to provide a voice command interface for the whole mobile device 206 while the voice assistant application 210 may be a user installed or sub-operating system level application that provides services below a device, system, or operating system level of the mobile device 206. In one embodiment, there is only one HFP voice application 208 activated for a mobile device 206 at a single time while there may be a plurality of voice assistant applications 210, which are available for use at any one time. Examples of a voice assistant application 210 may include Alexa® by Amazon®, or voice services provided by any other application that also is capable of integration with the application integration platform 204. For example, a voice assistant application 210 may include a music application, virtual assistant application, a smart home application, or any other type of application that provides voice services. Examples of a voice assistant application 210, according to one embodiment, includes application integration platforms such as Applink® by Ford®, iOS CarPlay®, Android Auto®, or the like.

The application integration platform 204 may detect the availability of a voice assistant application on one or more connected devices and send a message indicating the availability of each voice assistant application to the voice assistant manager 104. The application integration platform 204 may act as an interface between the voice assistant applications and the voice assistant manager 104. For example, the voice assistant manager 104, in response to detecting a wake word corresponding to the voice assistant application 210, may send a message to the application integration platform 204 to launch the voice assistant application 210. The application integration platform 204 may forward the voice commands to the voice assistant application 210 and receive a result, if any, of the command. A link established with the voice assistant application 210 may run between one or more peripherals (a microphone, display, or speaker) and voice assistant application 210 via the application integration platform 204. The application integration platform 204 may allow a user to access a voice assistant application 210 in the same manner as the voice control application 202 or HFP voice application 208, that is, by speaking the corresponding wake word. Thus, seamless connection to any voice assistant may be provided simply by speaking the wake word for that voice assistant.

The voice assistant manager 104, in one embodiment, maintains a list of wake words and their corresponding voice assistant application/service. Each wake word may, when detected, activate a corresponding voice assistant service native to the vehicle infotainment system 102 and/or on a separate device such as the mobile device 206. For example, in response to receiving an indication of availability of the voice control application 202, the voice assistant manager 104 may add the voice control application 202 and one or more corresponding wake words to a list. Similarly, availability of voice assistant services may be received from a mobile device 206 and/or an application integration platform 204.

In one embodiment, the voice assistant manager 104 may establish a link with a voice assistant service in response to detection of the wake word. When the link is established, a prompt may be given to a user to indicate that the voice assistant service is available to receive voice input or commands. For example, the wake word may be used to trigger a dynamic session that may continue until the user says so or stops providing voice input for a specified period of time. An example of this is the user speaking a wake word, waiting until a prompt indicates that the wake word has been detected and that the voice service is ready for a command, and then speaking the command. Thus, a user may be able to continue to provide a voice command, receive feedback, and provide additional voice commands as long as desired. However, until the link or session with the voice assistant service ends, other voice assistant services may not be available as the microphone, display, and/or speakers may be available only to the currently activated voice assistant service.

In another embodiment, a voice assistant manager 104 may receive and parse out audio on the fly without requiring a user to wait for a prompt. For example, the user may speak a wake word and a corresponding command without waiting for the prompt. As an example, the user may speak the wake word and the command without any delay or prompt between the wake word and command. The voice assistant manager 104 may process the audio to parse out the wake word, and then provide the command to the correct voice assistant service. The user may also be able to provide commands to a plurality of different voice assistant services without waiting for the switch between services. For example, the user may say a first wake word followed by a first command corresponding to a first voice assistant; a second wake word followed by a second command corresponding to a second voice assistant; and a third wake word followed by a third command corresponding to a third voice assistant without delay or waiting for respective prompts. In one embodiment, the voice assistant manager 104 parses out the audio into three different commands for three different voice assistants. For example, the voice assistant manager 104 may parse out the different commands, remove the wake words, and provide the commands to their respective services as follows: provide the first command to the first voice assistant, provide the second command to the second voice assistant, and provide the third command to the third voice assistant. An example statement may be "Siri, play music. Alexa, open garage door. Google, tell me about the weather," all without pauses or delays between commands. The voice assistant manager 104 may then receive responses from each system and, in turn, provide the responses in a visual or audio format to the user. As another example, a plurality of commands in a continuous utterance may only be provided to the same voice assistant or application.

In one embodiment, the mobile device 206 may provide audio or queries to a cloud recognizer 212 for voice detection or command interpretation. For example, the cloud recognizer 212 may include a network accessible service or resource that detects words or commands within audio. The cloud recognizer 212 may receive a query, including audio data from the mobile device 206, and provide a result. The result may include a result of executing a command in the query or a command to be performed by the mobile device 206 in response to the query.

Some embodiments may also provide access to applications or services that do not have voice recognition capabilities. For example, a voice assistant manager 104 may provide a similar experience for regular apps (such as applications for music streaming, weather, and/or navigation apps) which may not have the voice recognition capabilities. In one embodiment, "listen-interpret" responsibilities may be handled by an in-vehicle infotainment systems native/default voice assistant. For example, the in-vehicle infotainment system may, using an application integration platform 204, build a database for the non-voice applications available on the in-vehicle infotainment system or connected devices. The database may include a wake-word, menu options, capabilities, actions the app can take, and/or the like. The voice assistant manager 104 may interpret voice commands, perform one or more selections within a corresponding application (such as opening a menu, selecting an item from the menu, and clicking a button or item) to cause the non-voice application to perform the requested function. Example commands may include "Pandora[®] play my recently liked songs", "Waze[®] . . . navigate to work", "AccuWeather[®] . . . how's the weather looking ahead", or the like.

It should be noted that adding too many wake-words to be detected by the voice assistant manager 104 may introduce additional false wakes. Thus, assignment of a wake word may be regulated by an original equipment manufacturer's policy servers. For example, a manufacturer vehicle infotainment system 102 or a creator of the voice assistant manager 104 may reference a remote server to determine a wake word for a detected voice or non-voice application present on a connected device. The voice assistant manager 104 may also be context aware to avoid the most obvious false positive detection of wake words. For example, a current location of a vehicle, noise level, phone call status, or other status of the vehicle infotainment system or connected device may be used by the voice assistant manager 104 that a specific application is not available or useful at a current time period. Rule based filters or policies may be set to cause certain wake words to be ignored at desired times.

By way of example, a non-voice weather application may include a starting interface that includes "Alert", "Today's Forecast", and "Menu" options. In order to access the forecast, without improvements discussed herein, the user may be required to: first, press a push-to-talk button; second, say or tap the name of the application; third, wait for the interface to load; fourth, say or tap the "Today's Forecast" option; and then, finally, see the weather. By comparison, according to one example embodiment, the user may simply say "AccuWeather[®] . . . how's the weather today", after which the voice assistant manager 104 detects the wake word, identifies a corresponding application, looks up the menu options and available actions, detects a word in the command that corresponds to a menu item or action, and causes the application to perform the action. This significantly simplifies the use input required. For example, the user may simply say "AccuWeather"®, await a voice prompt, and say "how's the weather today?", after which the display is updated and the user can view the information.

It should be noted that different wake-words for a single voice assistant may or may not have different context. For example, in one scenario wake-words: "Spotify", "Pandora", "AccuWeather", "Ok Mustang", "Ok Sync" all summon the default voice assistant on in-vehicle infotainment system. However, the voice recognition/interpretation logic may change based on the exact wake-word used. This is to avoid ambiguity of commands from default voice assistant's grammar (ex: the command "Play my playlist <playlist-name>" may be available for both Pandora and Spotify). In another scenario wake-words: "Ok Google", "Hey Google" both point to Google's voice assistant but there's no contextual information and there'll be no difference in perception of user commands. In one embodiment, an indication of the specific wake word that was detected is provided to the voice assistant by the system. This may allow the voice assistant to activate a different function, application, or option within a non-voice application based on the specific wake word.

Figure 3:
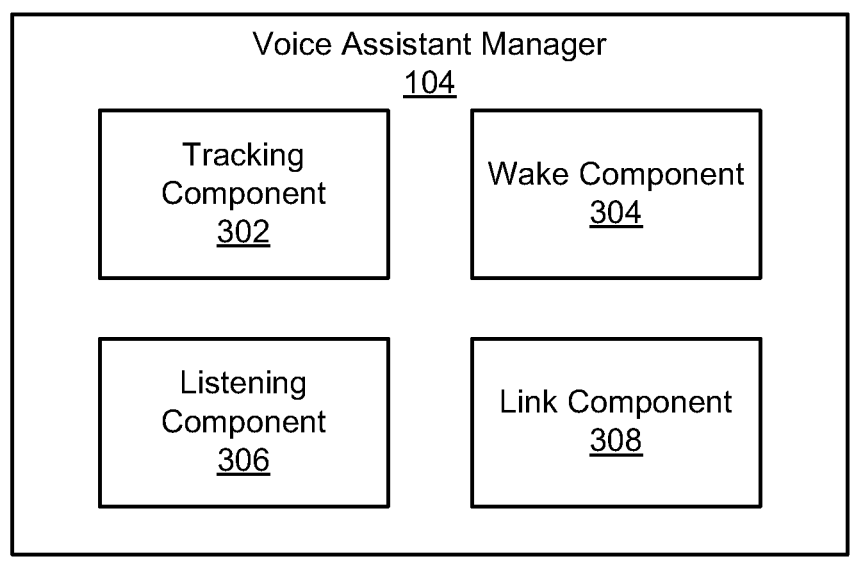
FIG. 3 is a schematic block diagram illustrating example components of a voice assistant manager, according to one implementation.

Turning to FIG. 3, a schematic block diagram illustrating components of a voice assistant manager 104, according to one embodiment, is shown. The voice assistant manager 104 includes a tracking component 302, a wake component 304, a listening component 306, and a link component 308. The components 302-308 are given by way of illustration only and may not all be included in all embodiments. In fact, some embodiments may include only one or any combination of two or more of the components 302-308. For example, some of the components 302-308 may be located outside the voice assistant manager 104, such as within the system 100 of FIG. 1.

The tracking component 302 tracks availability of a plurality of voice assistant services. In one embodiment, the tracking component 302 tracks availability by maintaining a list of available voice assistant services on devices in communication with a computing system integrated in the vehicle. For example, the tracking component 302 may receive messages from the voice assistant services, corresponding devices, or an application integration platform indicating that a specific voice assistant service is available. The message may also include one or more wake words that correspond to each voice assistant service. In one embodiment, the tracking component 302 is configured to track availability of a voice control application provided by a computing system integrated in the vehicle. For example, voice control application may include a native voice assistant service installed on a computing system in the vehicle.

In one embodiment, the tracking component 302 is configured to track availability of a hands-free profile on a mobile computing device not integrated in the vehicle. For example, after pairing with one or more mobile devices, the tracking component 302 may receive a message indicating the availability, type, and/or wake word for an HFP voice application 208. In one embodiment, the tracking component 302 is configured to track availability of a voice assistant application running on a mobile computing device. For example, the voice assistant manager 104 may include or communicate with an application integration platform 204 that detects and communicates with a voice assistant application 210 that may or may not be an HFP voice application 208.

The wake component 304 determines a plurality of wake words for voice assistant services. For example, the wake component 304 may maintain a list of wake words for a plurality of voice assistant services that are currently available, as determined by the tracking component 302. The wake words may include a first wake word for a first voice assistant service and a second wake word for a second voice assistant service and so forth for each voice assistant service. The wake component 304 may store or determine one or more wake words for each service. For example, some voice assistant services may have more than one wake word. In one embodiment, the wake component 304 maintains a list of wake words that correspond to currently available voice assistants.

The listening component 306 listens to audio captured by a microphone in the vehicle. For example, the listening component 306 may analyze a stream of audio captured by one or more microphones to detect any wake words for available voice assistant services. In one embodiment, the listening component 306 is configured to receive audio and detect a first wake word that corresponds to a first voice assistant service to trigger. The listening component 306 may continuously monitor cabin noise to detect a wake word spoken by a passenger or driver. In one embodiment, the listening component 306 may parse out commands that follow a wake word. For example, the listening component 306 may parse out a plurality of wake words and commands from a section of audio captured by the microphone. In one embodiment, the listening component 306 may parse out wake words and select audio between wake words as commands for providing to the service corresponding to the wake word immediately preceding the audio.

The link component 308 establishes a voice link with the first voice assistant service for voice input by the user. In one embodiment, in response to the listening component detecting the wake word, the link component 308 establishes an audio link between the microphone and the second voice assistant service for voice input from the user. In one embodiment, the link component 308 establishes the audio link by providing audio following the wake word to the appropriate voice assistant service. In one embodiment, the link component 308 may establish a session with the voice assistant service where all audio from one or more microphones is fed to the voice assistant service until the user explicitly issues a command to end the session or stops providing voice input for a period of time. For example, the link component may establish the voice link by providing audio following the wake word to the first voice assistant and providing audio, video, or other information from the first voice assistant to one or more speakers or displays.

In one embodiment, the link component 308 may receive commands parsed by the listening component 306 and provide chunks of audio to the appropriate voice assistant service. For example, the listening component 306 may parse out audio in the following order: a first wake word; voice data; a second wake word; voice data; a third wake word; and voice data. The link component 308 may provide the voice data following the first wake word and before the second wake word to the voice assistant service corresponding to the first wake word. Similarly, the link component 308 may provide the voice data following the second wake word and before the third wake word to the voice assistant service corresponding to the second wake word; and provide the voice data following the third wake word to the voice assistant service corresponding to the third wake word.

The link component 308 may also provide audio or other data from the voice assistants for providing information or data back to the user via a display or speaker. For example, during a voice session the link component 308 may provide responses to commands as well as queries from the voice assistant as to whether the user has additional commands. When the user indicates that there are no more commands, the link component 308 may release the session between the voice assistant and the audio or visual resources so that additional commands for different voice assistants can be issued. As another example, after providing a plurality of parsed out commands to different voice assistant services, the link component 308 may provide responses to the respective commands. By way of illustration a user may say "Siri, play music. Alexa, open garage door. Google, tell me about the weather" and the audio system may respond, based on data provided back by respective services "playing music [music starts], the garage door has been shut, and the weather is sunny with a high of 75 degrees."

Figure 4:
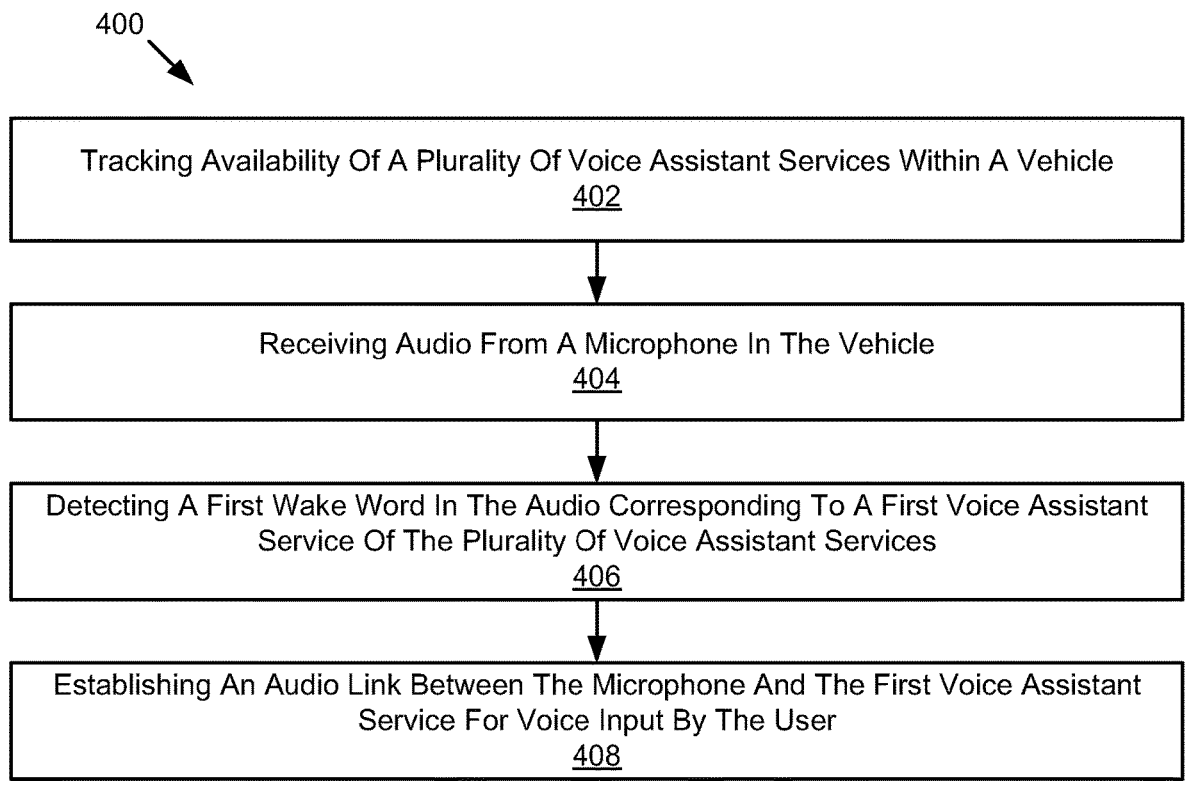
FIG. 4 is a schematic flow chart diagram illustrating a method for voice assistant tracking and activation, according to one implementation.

FIG. 4 is a schematic flow chart diagram illustrating a method 400 for voice assistant tracking and activation. The method 400 may be performed by a voice assistant manager or a system for voice assistant tracking and activation, such as the voice assistant manager 104 of FIG. 1, 2, or 3 or the system 100 of FIG. 1 or 2.

The method 400 begins and a tracking component 302 tracks at 402 availability of a plurality of voice assistant services within a vehicle. A listening component 306 receives at 404 audio from a microphone in the vehicle. The listening component 306 detects at 406 a first wake word in the audio corresponding to a first voice assistant service of the plurality of voice assistant services. A link component 308 establishes at 408 an audio link between the microphone and the first voice assistant service for voice input by the user. The link component 308 may establish at 408 the audio link in response to detecting the first wake word.

Figure 5:
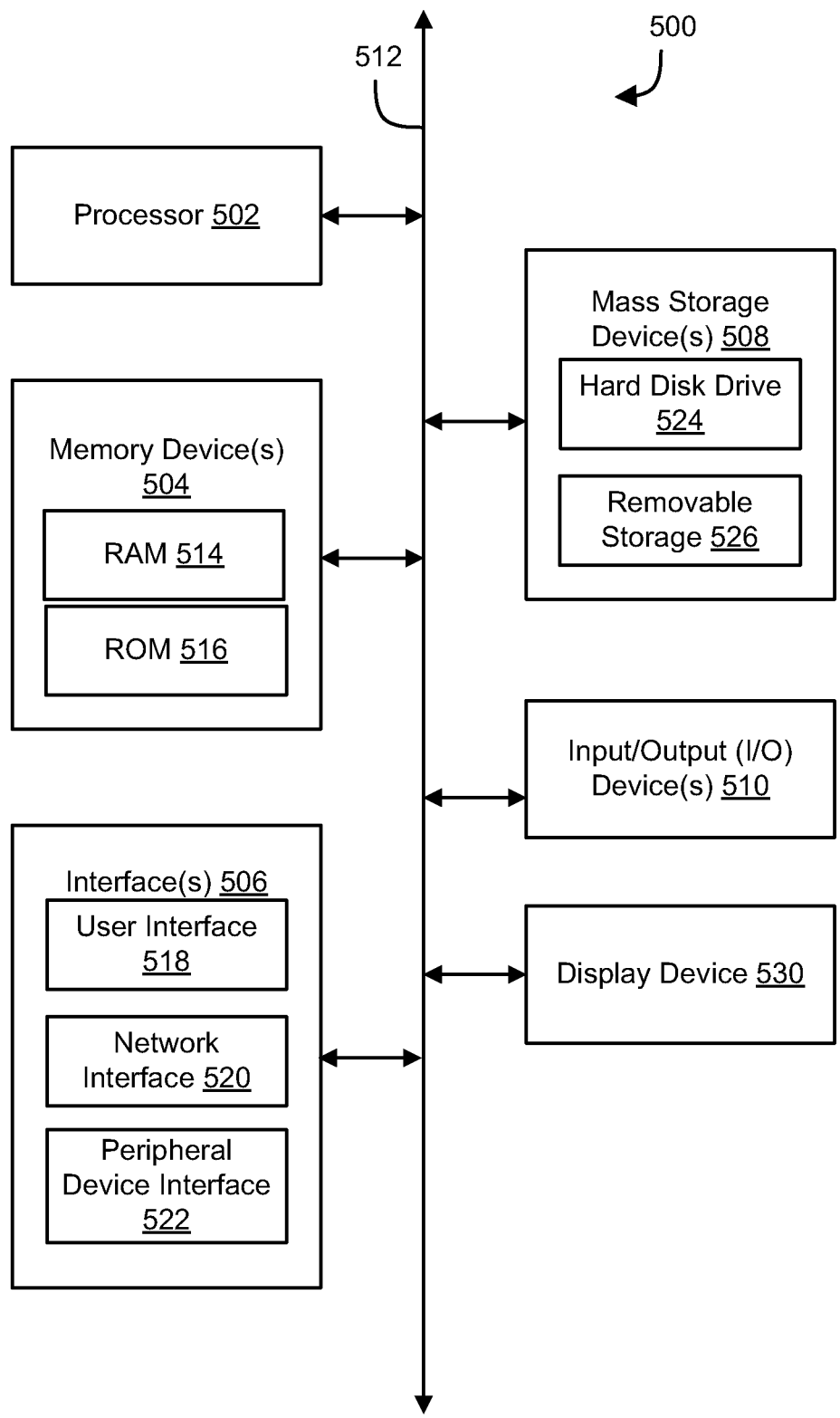
FIG. 5 is a schematic block diagram illustrating a computing system, according to one implementation.

Referring now to FIG. 5, a block diagram of an example computing device 500 is illustrated. Computing device 500 may be used to perform various procedures, such as those discussed herein. In one embodiment, the computing device 500 can function as a voice assistant manager 104, system 100, or the like. Computing device 500 can perform various monitoring functions as discussed herein, and can execute one or more application programs, such as the application programs or functionality described herein. Computing device 500 can be any of a wide variety of computing devices, such as a desktop computer, in-dash computer, vehicle control system, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 may include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, or any suitable user interface now known to those of ordinary skill in the field, or later discovered), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method that includes tracking availability of a plurality of voice assistant services within a vehicle. The method includes receiving audio from a microphone in the vehicle. The method includes detecting a first wake word in the audio corresponding to a first voice assistant service of the plurality of voice assistant services. The method includes, in response to detecting the first wake word, establishing an audio link between the microphone and the first voice assistant service for voice input by the user.

In Example 2, the method of Example 1 further includes determining a plurality of wake words corresponding to the plurality of voice assistant services, the plurality of wake words including the first wake word for the first voice assistant service and a second wake word for a second voice assistant service of the plurality of voice assistant services.

In Example 3, the plurality of voice assistant services as in any of Examples 1-2 include one or more of: a voice control application provided by a computing system integrated in the vehicle; a hands-free profile on a mobile computing device not integrated in the vehicle; and a voice assistant application running on a mobile computing device.

In Example 4, tracking availability as in any of Examples 1-3 includes maintaining a list of available voice assistant services on devices in communication with a computing system integrated in the vehicle.

In Example 5, the method of Example 4 further includes pairing with a computing device and identifying one or more voice assistant services on the device and adding the one or more voice assistant services to the list of voice assistant services.

In Example 6, the method as in any of Examples 1-5 further includes detecting a second wake word in the audio corresponding to a second voice assistant service of the plurality of voice assistant services. The method also includes, in response to detecting the second wake word, establishing an audio link between the microphone and the second voice assistant service for voice input from the user.

In Example 7, establishing the voice link as in any of Examples 1-6 includes providing audio following the wake word to the first voice assistant and providing audio from the first voice assistant to one or more speakers.

Example 8 is a system that includes a tracking component, a wake component, a listening component, and a link component. The tracking component is configured to track availability of a plurality of voice assistant services. The wake component is configured to determine a plurality of wake words, each plurality of wake words corresponding to a specific voice assistant service of the plurality of voice assistant services. The listening component is configured to receive audio and detect a first wake word of the plurality of wake words that corresponds to a first voice assistant service of the plurality of voice assistant services. The link component is configured to establish a voice link with the first voice assistant service for voice input by the user.

In Example 9, the plurality of wake words as in Example 8 includes the first wake word for the first voice assistant service and a second wake word for a second voice assistant service of the plurality of voice assistant services.

In Example 10, the tracking component as in any of Examples 8-9 is configured to track availability of voice assistant services including one or more of: a voice control application provided by a computing system integrated in the vehicle; a hands-free profile on a mobile computing device not integrated in the vehicle; and a voice assistant application running on a mobile computing device.

In Example 11, the tracking component as in any of Examples 8-10 is configured to track availability by maintaining a list of available voice assistant services on devices in communication with a computing system integrated in the vehicle.

In Example 12, the tracking component of Example 11 is configured to pair with a computing device and identify one or more voice assistant services on the device, and add the one or more voice assistant services to the list of voice assistant services.

In Example 13, the wake component as in any of Examples 8-12 determines a plurality of wake words for a single voice assistant. The link component is configured to, in response to detecting a specific wake word, establish a voice link and provide an indication of the specific wake word to the single voice assistant. The single voice assistant is configured to activate a different function based on the specific wake word.

In Example 14, the link component as in any of Examples 8-13 is configured to establish the voice link by providing audio following the wake word to the first voice assistant and providing audio from the first voice assistant to one or more speakers.

Example 15 is computer readable storage media storing instructions that, when executed by one or more processors, cause the one or more processors to track availability of a plurality of voice assistant services within a vehicle. The instructions cause the one or more processors to receive audio from a microphone in the vehicle. The instructions cause the one or more processors to detect a first wake word in the audio corresponding to a first voice assistant service of the plurality of voice assistant services. The instructions cause the one or more processors to, in response to detecting the first wake word, establish an audio link between the microphone and the first voice assistant service for voice input by the user.

In Example 16, the instructions as in Example 15 further cause the one or more processors to track availability of voice assistant services including one or more of: a voice control application provided by a computing system integrated in the vehicle; a hands-free profile on a mobile computing device not integrated in the vehicle; and a voice assistant application running on a mobile computing device.

In Example 17, the instructions as in any of Examples 15-16 cause the one or more processors to track availability by maintaining a list of available voice assistant services on devices in communication with a computing system integrated in the vehicle.

In Example 18, the instructions as in any of Examples 15-17 further cause the one or more processors to pair with a computing device and identify one or more voice assistant services on the device, and add the one or more voice assistant services to the list of voice assistant services.

In Example 19, the instructions as in any of Examples 15-18 further cause the one or more processors to detect a second wake word in the audio corresponding to a second voice assistant service of the plurality of voice assistant services and to, in response to detecting the second wake word, establish an audio link between the microphone and the second voice assistant service for voice input from the user.

In Example 20, the instructions as in any of Examples 15-19 further cause the one or more processors to establish the voice link by providing audio following the wake word to the first voice assistant and providing audio from the first voice assistant to one or more speakers.

Example 21 is a system or device that includes means for implementing a method or realizing a system or apparatus in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method comprising:
    tracking, by a computing system integrated in a vehicle, availability of a plurality of voice assistant services within the vehicle, each of the voice assistant services configured to utilize a different respective recognizer for voice input and command interpretation, the tracking including receiving messages indicating wake words corresponding to each of the plurality of voice assistant services;
    receiving audio from a microphone integrated in the vehicle;
    determining, using the messages, a plurality of wake words corresponding to the plurality of voice assistant services, the plurality of wake words comprising a first wake word for a first voice assistant service provided by a first device and a second wake word for a second voice assistant service provided by a second device;
    detecting the first wake word in the audio corresponding to the first voice assistant service of the plurality of voice assistant services; and
    in response to detecting the first wake word, establishing an audio link between the microphone and the first voice assistant service for voice input by a user, wherein at least one voice assistant service of the plurality of voice assistant services comprises a voice assistant service provided by a computing device not integrated in the vehicle.

2. The method of claim 1, wherein the first wake word comprises a first unique wake word and wherein the second wake word comprises a second unique wake word, wherein determining a plurality of wake words corresponding to the plurality of voice assistant services comprises determining the first unique wake word for an integrated voice assistant service integrated in the vehicle and the second unique wake word for a non-integrated voice assistant service that is not integrated in the vehicle.

3. The method of claim 1, wherein the plurality of voice assistant services comprises one or more of: a voice control application provided by a computing system integrated in the vehicle; a hands-free profile on a mobile computing device not integrated in the vehicle; and a voice assistant application running on a mobile computing device.

4. The method of claim 1, wherein tracking availability comprises maintaining a list of available voice assistant services on devices in communication with the computing system integrated in the vehicle.

5. The method of claim 4, further comprising pairing with a computing device and identifying one or more voice assistant services on the device, and adding the one or more voice assistant services to the list of available voice assistant services.

6. The method of claim 1, further comprising:
detecting the second wake word in the audio corresponding to the second voice assistant service of the plurality of voice assistant services; and
in response to detecting the second wake word, establishing an audio link between the microphone and the second voice assistant service for voice input from the user.

7. The method of claim 1, where establishing the audio link comprises providing audio following the first wake word to the first voice assistant service and providing audio from the first voice assistant service to one or more speakers integrated into the vehicle.

8. The method of claim 1, further comprising maintaining, for each of the plurality of voice assistant services, a list of the wake words corresponding to the respective voice assistant service, wherein detecting the first wake word in the audio corresponding to the first voice assistant service of the plurality of voice assistant services includes identifying the first wake word as being included on a list of wake words corresponding to the first voice assistant.

9. The method of claim 1, further comprising:
detecting the second wake word in the audio corresponding to the second voice assistant service of the plurality of voice assistant services;
parsing the audio into a first audio chunk associated with the first wake word and a second audio chunk associated with the second wake word;
providing the first audio chunk to the first voice assistant service; and
providing the second audio chunk to the second voice assistant service.

10. A system comprising:
a tracking component integrated in a vehicle and configured to track availability of a plurality of voice assistant services, each of the voice assistant services configured to utilize a different respective recognizer for voice input and command interpretation, wherein to track the availability includes receiving messages indicating wake words corresponding to each of the plurality of voice assistant services;
a wake component integrated in the vehicle and configured to determine a plurality of wake words using the messages, each plurality of wake words corresponding to a specific voice assistant service of the plurality of voice assistant services, wherein the plurality of wake words comprises a first wake word for a first voice assistant service provided by a first device and a second wake word for a second voice assistant service provided by a second device;
a listening component integrated in the vehicle and configured to receive audio and detect a first wake word of the plurality of wake words that corresponds to a first voice assistant service of the plurality of voice assistant services; and
a link component integrated in the vehicle and configured to establish a voice link with the first voice assistant service for voice input by a user,
wherein at least one voice assistant service of the plurality of voice assistant services comprises a voice assistance service provided by a computing device not integrated in the vehicle.

11. The system of claim 10, wherein the first wake word comprises a first unique wake word and wherein the second wake word comprise a second unique wake word.

12. The system of claim 10, wherein the tracking component is configured to track availability of voice assistant services comprising one or more of:
a voice control application provided by a computing system integrated in the vehicle;
a hands-free profile on a mobile computing device not integrated in the vehicle; and
a voice assistant application running on a mobile computing device.

13. The system of claim 10, wherein the tracking component is configured to track availability by maintaining a list of available voice assistant services on devices in communication with a computing system integrated in the vehicle.

14. The system of claim 13, wherein the tracking component is configured to pair with a computing device and identify one or more voice assistant services on the device, and add the one or more voice assistant services to the list of available voice assistant services.

15. The system of claim 10, wherein the wake component determines a plurality of wake words for a single voice assistant, the link component is configured to, in response to detecting a specific wake word, establish a voice link and provide an indication of the specific wake word to the single voice assistant, and wherein the single voice assistant is configured to activate a different function based on the specific wake word.

16. The system of claim 10, wherein the link component is configured to establish the voice link by providing audio following the wake word to the first voice assistant and providing audio from the first voice assistant to one or more speakers.

17. A non-transitory computer readable storage media storing instructions that, when executed by one or more processors, cause the one or more processors to:
track availability of a plurality of voice assistant services within a vehicle, each of the voice assistant services configured to utilize a different respective recognizer for voice input and command interpretation, wherein to track the availability includes receiving messages indicating wake words corresponding to each of the plurality of voice assistant services;
receive audio from a microphone integrated in the vehicle;
determine, using the messages, a plurality of wake words corresponding to the plurality of voice assistant services, the plurality of wake words comprising a first wake word for a first voice assistant service provided by a first device and a second wake word for a second voice assistant service provided by a second device;
detect the first wake word in the audio corresponding to the first voice assistant service of the plurality of voice assistant services; and
in response to detecting the first wake word, establish an audio link between the microphone and the first voice assistant service for voice input by a user,
wherein at least one voice assistant service of the plurality of voice assistant services comprises a voice assistance service provided by a computing device not integrated in the vehicle.

18. The non-transitory computer readable storage media of claim 17, wherein the instructions further cause the one or more processors to track availability of voice assistant services comprising one or more of: a voice control application provided by a computing system integrated in the vehicle; a hands-free profile on a mobile computing device not integrated in the vehicle; and a voice assistant application running on a mobile computing device.

19. The non-transitory computer readable storage media of claim 17, wherein the instructions cause the one or more processors to track availability by maintaining a list of available voice assistant services on devices in communication with a computing system integrated in the vehicle.

20. The non-transitory computer readable storage media of claim 19, wherein the instructions further cause the one or more processors to pair with a computing device and identify one or more voice assistant services on the device, and add the one or more voice assistant services to the list of available voice assistant services.

21. The non-transitory computer readable storage media of claim 17, wherein the instructions further cause the one or more processors to:
detect the second wake word in the audio corresponding to the second voice assistant service of the plurality of voice assistant services; and
in response to detecting the second wake word, establish an audio link between the microphone and the second voice assistant service for voice input from the user.

22. The non-transitory computer readable storage media of claim 17, wherein the instructions further cause the one or more processors to establish the audio link by providing audio following the wake word to the first voice assistant and providing audio from the first voice assistant to one or more speakers.

* * * * *